United States Patent [19]

Ruer

[11] Patent Number: 4,462,458

[45] Date of Patent: Jul. 31, 1984

[54] ELECTROMAGNETIC INDUCTOR WITH A ROTATING FIELD AND APPARATUS FOR THE CONTINUOUS CASTING OF METAL FOR ITS USE

[75] Inventor: Jacques Ruer, Croissy, France

[73] Assignee: Rotelec Société Anonyme, Paris, France

[21] Appl. No.: 364,664

[22] Filed: Apr. 2, 1982

[30] Foreign Application Priority Data

Apr. 3, 1981 [FR] France ................................ 81 06909

[51] Int. Cl.³ ............................................. B22D 27/02
[52] U.S. Cl. .................... 164/504; 164/147.1; 310/41
[58] Field of Search ............ 164/468, 504, 499, 147.1, 164/150, 155, 449; 310/11, 13, 41; 416/51

[56] References Cited

U.S. PATENT DOCUMENTS

| | | | |
|---|---|---|---|
| 3,857,053 | 12/1974 | Yatsushiro et al. | 310/41 X |
| 4,021,689 | 5/1977 | Baltrush | 310/41 |
| 4,061,936 | 12/1977 | Woolley | 310/41 |
| 4,274,024 | 6/1981 | Gottschalk | 310/41 X |

Primary Examiner—Kuang Y. Lin
Attorney, Agent, or Firm—Michael J. Striker

[57] ABSTRACT

An electromagnetic inductor for producing a rotating magnetic field for use with an ingot mold for continuous casting of metal and provided with an apparatus for sensing the upper level of liquid metal in the mold. The inductor, of the static polyphase type, comprises an annular magnetic yoke provided with a plurality of radially inwardly projecting poles having each an exciter winding and at least two adjacent poles are spaced further in the circumferential direction of the yoke from each other than the other pole. The yoke may be provided in the region between these two poles with a cutout and beneath the cutout with a portion of increased thickness. The inductor may be used around an ingot mold for the continuous casting of metal provided with a gamma ray emitter and a gamma ray receiver located at opposite sides of the mold for detecting the position of the level of the cast liquid metal. The upper level of the inductor is located in the path of the rays from the emitter to the receiver with the pair of poles and the cutout in the yoke located along a central axis of the bundle of rays.

11 Claims, 3 Drawing Figures

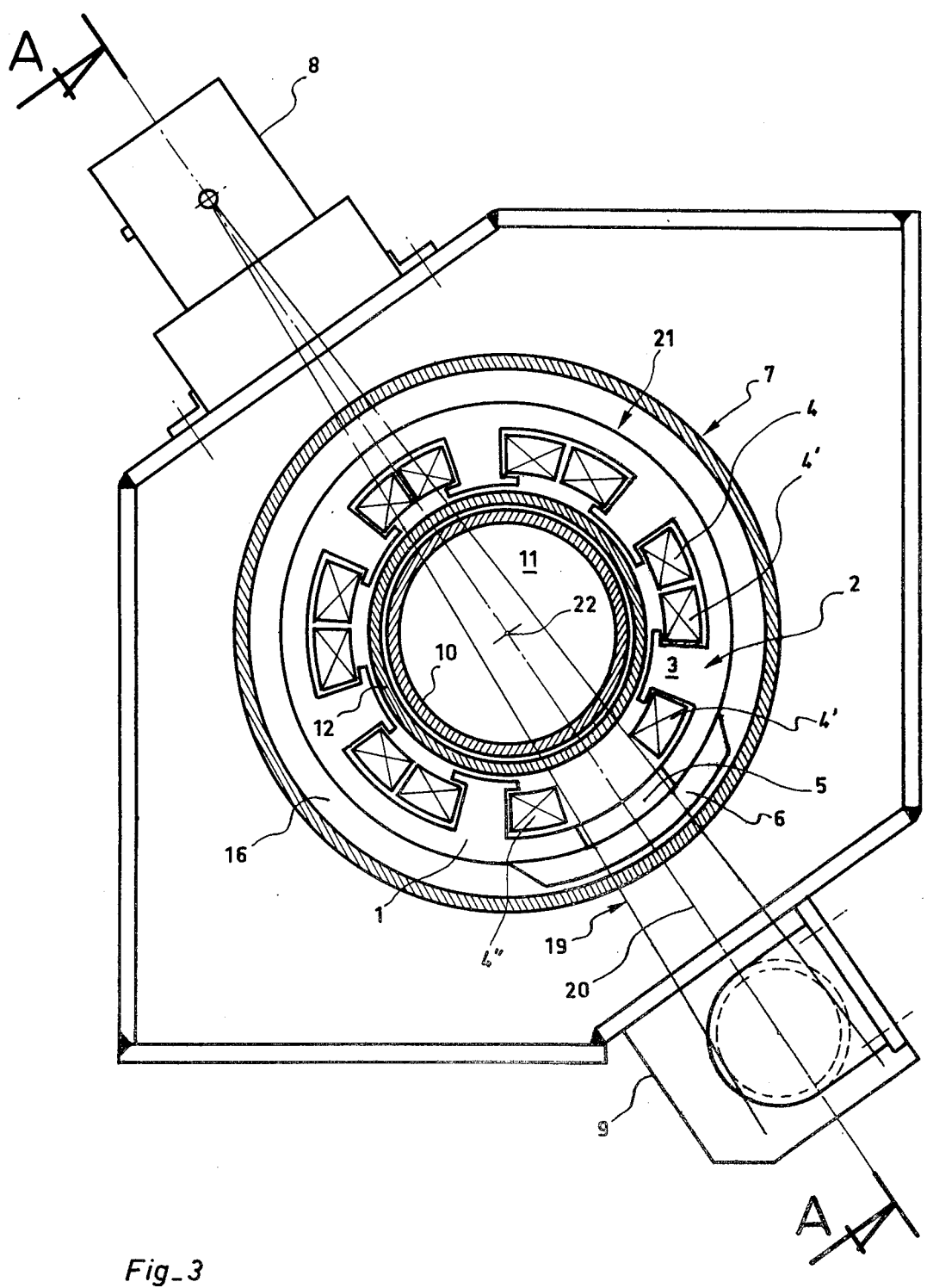
Fig_3

ELECTROMAGNETIC INDUCTOR WITH A ROTATING FIELD AND APPARATUS FOR THE CONTINUOUS CASTING OF METAL FOR ITS USE

BACKGROUND OF THE INVENTION

The present invention relates to stirring of molten metal during its continuous casting by means of an electromagnetic inductor producing a rotating field and surrounding the upper end portion of an ingot mold for the continuous casting of metal.

Inductors of the type considered are usually static polyphase inductors of annular form surrounding the ingot mold. These inductors usually comprise an annular, closed magnetic yoke provided with a plurality of poles projecting radially inwardly from the yoke, uniformly displaced from each other in the circumferential direction of the latter and each provided with an exciter winding.

Inductors of this type, as well as their application for the continuous casting of metal, are for instance described in the French Pat. No. 2,315,344 (IRSID) or No. 2,279,500 (Usinor). These inductors when mounted around the product to be cast will produce a magnetic field rotating about the axis of the metal cast and thus cause rotation of the liquid metal.

As is well known, especially during casting of steel, a controlled stirring of the liquid metal improves the quality of the casting produced, particularly as far as the structure of solidification is concerned.

It is likewise known that, in addition, it is possible to avoid inclusion in the cast metal by placing the inductor in the region of the upper end of the ingot mold to thereby centrifuge the free upper level of the cast metal in the latter.

Thus the inductor is usually placed at the upper level of the ingot mold to assure its maintenance at a proper temperature by cooling with a primary cooling water which cools the mold.

Such a process, to the industrial development of which the company to which the present application is assigned has made considerable contributions, is known to the public under the name "Magnetogyr Process".

This technique is generally practiced at all installations for the continuous casting of long product (billets, blooms, etc.).

However, a certain problem arises if the ingot mold is equipped with a system for detecting the level of the meniscus, formed at the upper free face of the rotating liquid metal, by means of gamma rays. As is known, such a system comprises an emitter of gamma rays and a receiver, for instance an ionization chamber, between which the cast metal passes, in which the metal in its upper portion is transversed by the bundle of rays, the diameter of which at the axis of the casting has to be sufficiently large in order to intercept the region of the flutuations of the height of the meniscus.

In the case of an ingot mold equipped with such a detecting system, it is usually not possible to place an inductor as high around the ingot mold as desired since the plurality of poles provided with the exciter windings present at the heads of the exciter windings, which project beyond the magnetic yoke, as well as the latter itself constitute a shield for the gamma rays.

SUMMARY OF THE INVENTION

It is a main object of the present invention to provide an electromagnetic inductor with a rotating field of a construction which would prevent the disadvantage pointed out above.

It is also an object of the present invention to provide an apparatus for the continuous casting of metal and provided with a system for detecting the upper level of the liquid metal to be cast with an inductor having a rotating magnetic field for stirring the liquid metal during its casting.

With these and other objects in view, which will become apparent as the description proceeds, it is a first object of the present invention to provide an electromagnetic inductor of the static polyphase type for producing a rotating field and comprising an annular magnetic yoke and a plurality of poles projecting radially inwardly from the yoke and each provided with an exciter winding, wherein at least two adjacent poles are spaced from each other in the circumferential direction of the yoke a distance greater than the other poles.

It will be understood that the invention therefore consists, as compared to usual inductors in which the poles are uniformly spaced from each other, to draw the poles closely adjacent to each other and to thereby realize a new distribution of the poles in which two adjacent poles are spaced further from each other in the circumferential direction of the magnetic yoke than the other poles to thereby produce at the heads of the respective exciter windings around this pair of poles a relative important spacing.

According to a further feature of the present invention the magnetic yoke is provided with a notch formed at its upper portion and located between the pair of poles which are spaced further from each other and in which the notch has a width at least equal to the aforementioned spacing.

On the other hand, it is likewise an object of the present invention to provide an ingot mold for the continuous casting of metal using the inductor as explained above and being equipped with a system for detecting the upper level of the liquid metal in the ingot mold by means of gamma rays and comprising an emitter of gamma rays and a gamma-ray receiver between which the cast metal passes and in which the ingot mold is equipped with the aforementioned inductor in which the spacing between the two poles which are spaced furthest from each other and the exciter windings surrounding the same is sufficient for the free passage of a bundle of gamma rays and in which the inductor is disposed at an angular position with respect to the ingot mold such that the bundle of gamma rays will pass adjacent the receiver between the poles and the exciter windings surrounding the same which are spaced furthest from each other. If the magnetic yoke of the inductor is notched, the latter is mounted around the ingot mold in such a manner that the notch appears at the upper edge of the magnetic yoke and that the notch is dimensioned in such a manner to permit free passage of the whole bundle of gamma rays.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 3 is a top view of the ingot mold shown in FIG. 2 with the upper cover removed.

DESCRIPTION OF A PREFERRED EMBODIMENT

Figure 1:
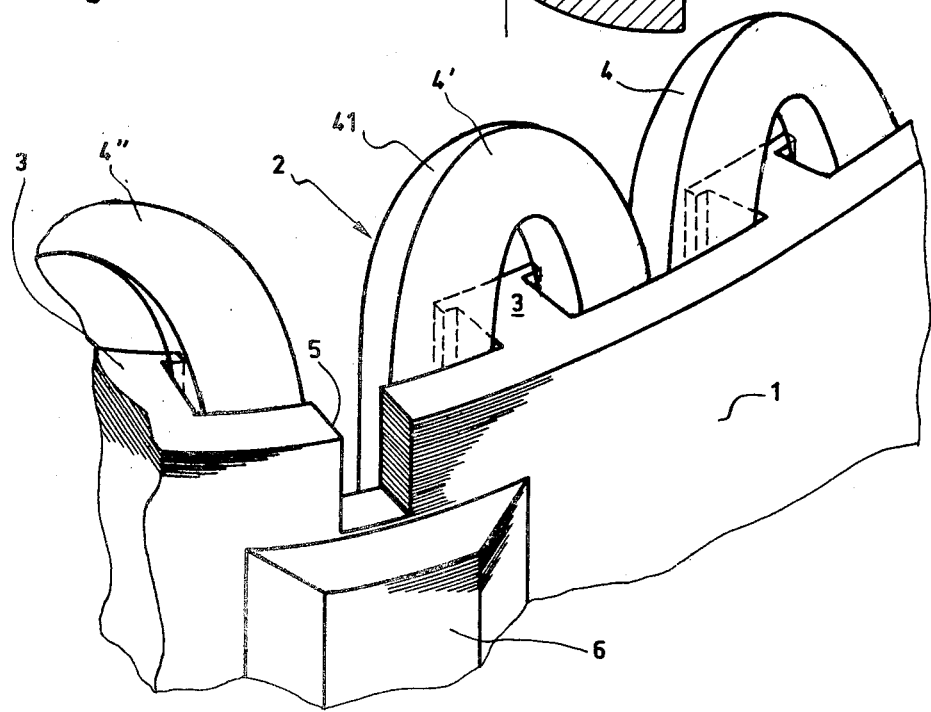
FIG. 1 is a partial perspective view of the inductor according to the present invention seen from the side at which the notch is provided in the magnetic yoke.

Referring to FIG. 1 of the drawing, it will be seen that the electromagnetic inductor according to the present invention comprises an annular magnetic yoke 1 of laminated sheet iron, on the inner periphery of which a plurality of pole means 2 are distributed, each constituted by a radially inwardly projecting magnetic pole 3 surrounded by an exciter winding 4. The heads of the exciter windings which extend beyond the poles 3 are designated with the reference numeral 41.

According to the present invention, the pole means 2 are closely arranged with respect to each other on the inner periphery of the magnetic yoke such that two adjacent pole means 4' and 4" at one end of the annular yoke present between themselves a spacing which is greater than the spacings between the remaining pole means.

According to a further feature of the present invention a notch 5 is provided in the magnetic yoke 1 extending downwardly from the upper edge thereof in the region located between the two pole means 4' and 4" which are spaced further from each other than the other pole means.

Advantageously an enlargement, i.e. an increased thickness 6, is provided on the magnetic yoke 1 beneath the notch 5. This enlargement is provided to compensate for the loss of magnetic circuit due to the removal of material at the region of the notch 5 so as to be able to conserve the degree of magnetic saturation which would be obtainable in the absence of the notch.

The following Figures illustrate the inductor according to the present invention mounted on an ingot mold for the continuous casting of steel and equipped with a system for detecting the upper level of the molten metal in the ingot mold by gamma rays.

Figure 2:
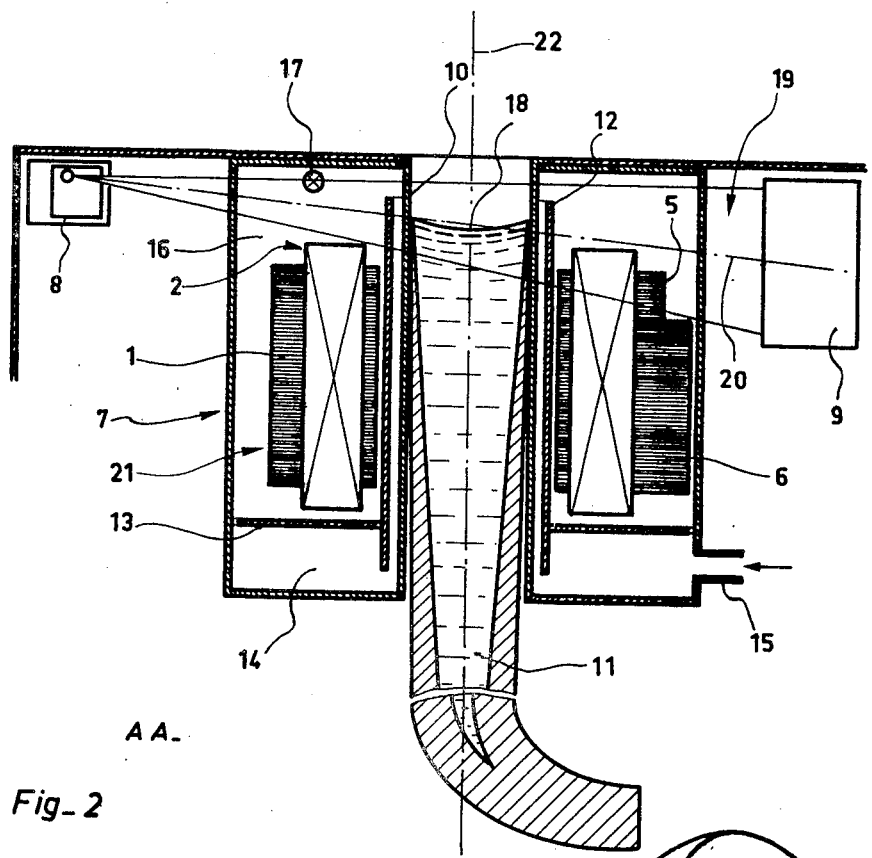
FIG. 2 is an axial cross section taken along the line A—A of FIG. 3 through an ingot mold for continuous casting of metal and provided with an electromagnetic inductor according to the present invention.

The ingot mold is designated in FIGS. 2 and 3 with the reference numeral 7 and these Figures show also a substantially point-like source 8 emitting gamma rays and receiver 9 for the gamma rays, constituted by an ionization chamber of relative large volume. The ingot mold 7 is constituted by an annular caisson having an inner wall 10 of copper or copper alloy, which defines a passage for the metal 11 to be cast. The element 10 is surrounded at a close distance by a sleeve 12 defining between the outer surface of the element 10 and the inner surface of the sleeve 12 a passage for circulation of cooling water. Furthermore, the interior of the caisson is divided by a transverse wall 13 into two superimposed compartments communicating with each other by the aforementioned passage between the sleeve 12 and the copper wall 10. The lower compartment 14 is provided with a cooling water inlet 15, whereas the upper compartment 16 is provided with a cooling water outlet 17. As can be seen from FIG. 2 the electromagnetic inductor 21 with a rotating field for stirring the metal 11 during its casting is placed within the upper compartment 16 at a sufficient elevation in order to act already at the level of the liquid meniscus 18, which due to the rotation imparted to the liquid metal has a concave form. The meniscus 18 is intercepted by the bundle 19 of gamma rays emanating from the source 8, the extension or diameter of which at the axis 22 of the ingot mold is determined in such a manner to cover the region of variations in the level of the meniscus.

As can be seen from FIGS. 2 and 3, the inductor 21 is arranged in such a manner that the notch 5 appears at the upper edge of the magnetic yoke 1. Furthermore, the inductor 21 is angularly oriented around the axis 22 in such a manner that the notch 5 is aligned with the mean direction of the gamma rays received by the receiver 9, that is with the axis 20 between the emitter 8 and the receiver 9. It will be understood that the extent of the bundle of gamma rays at the region of the magnetic yoke 1 adjacent to the receiver 9 will determine the width and the depth of the notch 5, and the extension of the bundle of gamma rays in this region is a function of the position of this region relative to the emitter 8 and the angle of which the gamma rays impinge on the receiver 9.

Of course, the dimensions of the notch will likewise depend on the position of the electromagnetic inductor 21 relative to the ingot mold and this position is, as stated before, determined to produce a stirring at the upper level of the metal in the ingot mold in such a manner to obtain a meniscus 8 of a concave profile.

In the embodiment illustrated in FIG. 2 the inductor 21 is positioned in such a manner that the bundle of gamma rays emanating from the source 8 passes over the left portion of the inductor 21. If for the reason mentioned above, it would be necessary to place the inductor higher into the body of the ingot mold it would be necessary, in order to avoid that the inductor forms a shield preventing the passage of the gamma rays, to provide an inductor according to the present invention which presents in addition to the pole means 4' and 4", another pair of spaced pole means which is diametrically opposed to the pair 4' and 4", such that a second increased spacing is provided at the supplementary pair of pole means and in which the magnetic yoke may be provided at the additional pair of pole means likewise with a cutout. Nevertheless, taking into account the radial spreading of the gamma rays from the source 8 to the receiver 9, the space between the supplementary pair of pole means as well as the dimension of the cutout formed in the magnetic yoke may be smaller in the pair of pole means adjacent to the source 8 than the spacing of the pair 4' or 4" and the cutout 5 adjacent to the receiver 9.

It is mentioned that in practice the conditions are often such that an increased spacing at the level of the heads of the exciter winding is sufficient, without the necessity to provide in addition a cutout in the magnetic yoke.

It will be understood that each of the elements described above, or two or more together, may also find a useful application in other types of electromagnetic inductors producing a rotating field differing from the types described above.

While the invention has been illustrated and described as embodied in an electromagnetic inductor producing a rotating magnetic field for use with an ingot mold provided with a system for detecting the position of the level of liquid metal in the mold by gamma rays, it is not intended to be limited to the details shown, since various modifications and structural changes may be made without departing in any way from the spirit of the present invention.

Thus, if the system for detecting the upper level of the liquid level in the ingot mold comprises a receiver of small dimensions, whereas the source of gamma rays is relatively large, it is necessary to arrange the electromagnetic inductor in such a manner that the two pole means which are spaced further from each other and eventually the cutout in the magnetic yoke are provided in the region of the inductor adjacent to the source.

On the other hand, one might think that the nonuniform distribution of the pole means at the inner periphery of the magnetic yoke according to the present invention might provoke a certain disturbance in the movement of the waves of the rotating magnetic flux. However, the structural modifications of the inductor described are sufficiently limited in such a manner in order not to cause any noteable effect on the stirring of the metal, as proven by tests carried out.

Without further analysis, the foregoing will so fully reveal the gist of the present invention that others can, by applying current knowledge, readily adapt it for various applications without emitting features that, from the standpoint of prior art, fairly constitute essential characteristics of the generic or specific aspects of this invention.

What is claimed as new and desired to be protected by Letters Patent is set forth in the appended claims.

I claim:

1. An electromagnetic inductor of the static polyphase type for producing a rotating magnetic field comprising an annular magnetic yoke and a plurality of poles projecting radially inwardly from said yoke and each provided with an exciter winding, wherein at least two adjacent poles are spaced from each other in the circumferential direction of said yoke a distance greater than the other poles, and wherein said yoke is provided in the region between said two poles with a cut-out of predetermined width.

2. An electromagnetic inductor as defined in claim 1, wherein the exciter windings surrounding the two poles have faces directed towards each other and wherein the width of said cut-out is substantially equal to the distance between said faces of the exciter winding.

3. An electromagnetic inductor as defined in claim 1, wherein two diametrically opposite pairs of adjacent poles are spaced in the circumferential direction of said yoke a distance greater than the other poles, and wherein said yoke is provided between each of said pair of poles with a cut-out of predetermined width.

4. An electromagnetic inductor as defined in claim 1, wherein said cut-outs extend from an upper edge of said yoke into the latter, and wherein said yoke is provided in the region of each cut-out with a portion of increased cross section extending over an uncut portion of said yoke beneath each cut-out at least over a distance equal to the width of the respective cut-out.

5. An electromagnetic inductor as defined in claim 1, wherein said cutout extends from the upper edge of said yoke into the latter.

6. An electromagnetic inductor as defined in claim 5, wherein said yoke is provided beneath said cutout with a portion of increased cross section extending over the uncut portion of the yoke at least through a distance equal to the width of said cutout.

7. Apparatus for a continuous casting of metal comprising an upright ingot mold; a system for detecting the position of the level of liquid metal in the mold by gamma rays and including a gamma ray emitter and a gamma ray receiver respectly located at diametrically opposite sides of the mold at an upper region of the latter; and an electromagnetic inductor of the static polyphase type for producing a rotating magnetic field coaxially surrounding said ingot mold and having an upper end portion located in the path of the gamma rays passing from said emitter to said receiver, said inductor comprising an annular magnetic yoke and a plurality of poles projecting radially inwardly from said yoke and each provided with an exciter winding, at least two adjacent poles are spaced from each other in the circumferential direction a distance greater than the other poles, said yoke being provided in the region between said two poles with a cutout extending from an upper edge of said yoke into the latter, said pair of poles and said cutout being located in the path of gamma rays from said emitter to said receiver and on that side of said ingot mold which is closer to said receiver.

8. Apparatus as defined in claim 7, wherein said inductor is provided with two pairs of adjacent poles which are spaced in circumferential direction of said yoke a distance greater than the other poles, wherein said yoke is provided in the region of each of said pair of poles with a cutout extending from an upper edge of said yoke into the latter, said two pairs of poles and said cutout being arranged diametrically opposite each other in the paths of gamma rays passing from said emitter to said receiver.

9. Apparatus as defined in claim 8, wherein the spacing between said pair of poles on the side of the receiver is greater than the spacing of the pair of poles on the side of the emitter.

10. An electromagnetic inductor as defined in claim 7, wherein said yoke is further provided beneath said cutout with a portion of increased thickness extending in circumferential direction of said yoke at least through a width equal to the width of said cut-out.

11. An electromagnetic inductor as defined in claim 8, wherein said yoke is further provided beneath each cut-out with a portion of increased thickness extending in circumferential direction of the yoke for a distance at least equal to the width of the respective cut-out.

* * * * *